United States Patent Office 3,562,977
Patented Feb. 16, 1971

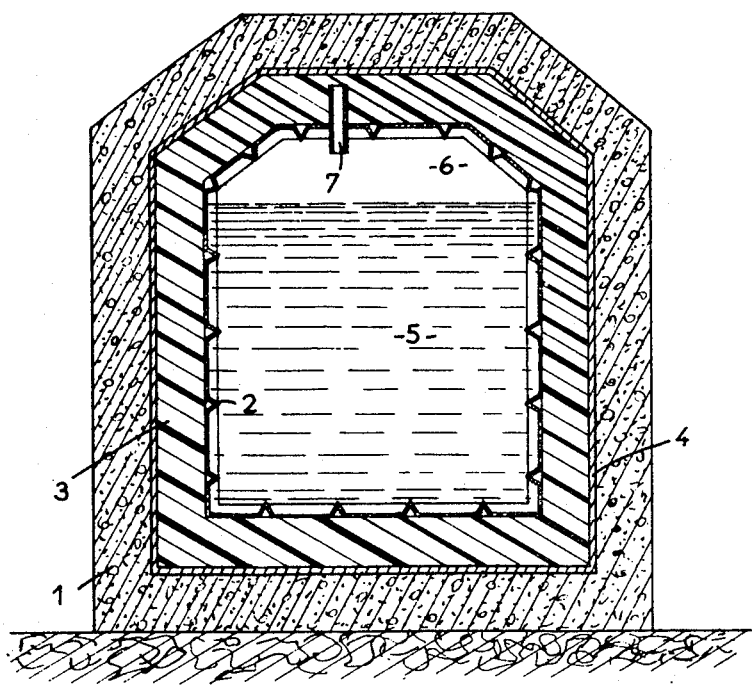

3,562,977
PRESSURE FLUID STORAGE TANK WITH AN
INNER MEMBRANE-LIKE ENVELOPE
Jean Alleaume, Saint-Cloud, France, assignor to Technigaz, Paris, Seine, France, a company of France
Filed Aug. 8, 1968, Ser. No. 751,106
Claims priority, application France, July 11, 1968,
158,885
Int. Cl. E04b 1/32; B65d 25/18, 7/22
U.S. Cl. 52—82
2 Claims

ABSTRACT OF THE DISCLOSURE

A pressure tank for storing an at least partially liquid fluid comprising an outer casing of self-supporting structure, an inner impervious, metallic, thin-walled, fluid-confining, membrane-like envelope carried by heat-insulating materials filling the intermediate space left between said envelope and casing, and open-ended duct means extending through the envelope wall for permanently interconnecting said intermediate space and that portion of the space inside said envelope which contains the fluid gaseous phase for equalizing the pressures therein applied to both opposite wall sides of said envelope to transfer the gaseous fluid pressure directly to said casing.

---

The present invention relates essentially to a closed, fluid-tight space or tank for the storage and preservation of a fluid under pressure, consisting preferably of at least two phases or being at least partially in a liquid state, said tank being of the type comprising an inner fluid-confining, membrane-like envelope, as well as to the various applications and uses resulting from putting said construction into practice and a method of building or making such a tank or closed storage space.

In the prior state of the art is already known such a construction forming a tank, vessel, vat, cistern or like closed container, comprising a substantially rigid outer envelope, casing or a shell of self-supporting structure, withstanding the applied pressure and an inner, impervious, thin-walled, fluid-confining, in particular metallic envelope, shell or casing, containing said fluid and forming a kind of flexible or yielding membrane carried or supported and backed by at least one intermediate layer of heat-insulating materials interposed between said inner and outer envelopes so as to fill the intermediate space left therebetween and bearing against said outer envelope.

Such known tanks have been used in particular for the storage, substantially at atmospheric pressure, of a fluid at a temperature strongly differing from the ambient temperature, such as a liquefied natural gas at very low temperature, as for example methane or like liquefied, strongly cooled hydrocarbon. The outer envelope is generally made from reinforced concrete in the case of small tanks and from prestressed concrete in the case of large or big tanks or it may even consist of a combination of both, the use of in particular prestressed concrete being most interesting from the economical standpoint for the building of large tanks, that is having a capacity above 10,000 m.³. These tanks, which are well suited to the storage under a pressure near atmospheric pressure, are not adapted to the storage under any pressure whatsoever, in particular above atmospheric pressure, since such pressures are then inconsistent with the mechanical strength of or resistance to crushing of the insulating materials generally used which exhibit good heat-inulating characteristics or properties generally associated with a small mass per unit of volume hence with a limited resistance to compression, such as for example perlite, which are advantageous by their qualities in particular because they are light, exhibit good heat-insulating characteristics or properties and also because they are relatively cheap or unexpensive.

A main object of the invention is to obviate this drawback by rendering said known tanks capable of storing under any pressure whatsoever, in particular above atmospheric pressure. For this purpose, the tank according to the invention is characterized in that it comprises means for balancing or equalizing the gaseous fluid pressures exerted upon the opposite faces or sides, respectively, of the wall of said inner, membrane-forming envelope and for transmitting or transferring the gaseous fluid pressure directly to said outer, pressure-resisting rigid envelope; these means preferably comprise at least one duct, conduit or channel for permanent intercommunication, extending through the wall of said inner membrane-like envelope to open and lead with its opposite ends, respectively, into the intermediate heat-insulating space and into the inner space, inside of said inner envelope, containing the gaseous or vapour phase of said fluid, so as to connect both spaces constantly and continuously.

This arrangement is advantageous because it enables to retain and keep all the advantages resulting from the use of a membrane-like envelope without any modification or alteration thereof, while raising the pressure level up to values inconsistent with the resistance to crushing of the heat-insulating materials used.

The respective functions of the inner envelope, forming a flexible or yielding membrane and the outer rigid envelope are thus clearly and plainly separate and distinct from each other, since the membrane serves to confine and contain the stored liquid directly while being capable of a satisfactory behaviour or holding at the temperature of said fluid, that is for example at the severe cold in the case of a liquefied natural gas, whereas the outer rigid envelope is adapted to withstand the fluid pressure and to support anything located inside thereof, so that it should exhibit a behaviour or holding satisfactory under any mechanical forces, efforts, stresses and strains whatsoever likely to be applied thereto. The inner membrane-like envelope thus is generally made from a noble metal, such as for example stainless steel, whereas the outer rigid envelope may be made from ordinary materials, such as concrete and steel, since it is in contact with the gaseous or vapour phase of the stored fluid only, which phase is not at a temperature likely to be harmful to or to adversely affect the mechanical strength of the materials forming the outer envelope in view of the presence of the heat-insulation.

According to a further characterizing feature of the invention, when said outer rigid envelope is relatively pervious to the gaseous in particular compressed fluid, this being for example the case with a concrete construction, the inside face of its wall is lined, faced, covered or coated with a continuous layer of impervious material, preferably a sheet-metal made for example of ordinary or low alloy steel, forming an intermediate impervious envelope covering the whole inner wall surface of said outer envelope. The use of a low alloy steel sheet is desirable in particular in the case for example of a relatively thick concrete wall in view of the relatively high thermal gradient which may then exist within the concrete wall and of the minimal working temperature which may then be reached by the steel sheet in particular in winter especially when liquefied natural gas is stored at very low temperature.

The invention is also concerned with a method of building or making said tank provided with an outer envelope made of reinforced and/or prestressed concrete, which method is characterized by using the impervious sheet-metal lining or facing, covering the inside wall surface of said outer envelope, as an inner formwork, shuttering or framing left or remaining permanently in place for casting, working or placing the concrete of said outer envelope. This method is therefore very advantageous since it allows to make a substantial saving by dispensing with making the inner part of the shuttering, formwork or framing required for the building of the outer rigid concrete envelope.

The invention will be better understood and further objects, characteristics, details and advantages thereof will appear as the following explanatory description proceeds with reference to the accompanying diagrammatic drawings, given by way of example only, illustrating an embodiment of the invention and wherein the single figure shows an elevational view in vertical section of a stationary tank for storing for example a liquefied natural gas under pressure.

According to the exemplary form of embodiment shown, this tank comprises an outer rigid envelope 1 of self-supporting structure, made of reinforced concrete in the case of small tanks and of prestressed concrete in the case of large tanks or from a combination of reinforced concrete and prestressed concrete. This outer envelope generally has a flat bottom and its lateral wall has preferably a substantially circular cylindrical shape with a substantially vertical axis of revolution, whereas its top or roof has desirably substantially the shape of a frustrum of a cone and is substantially coaxial with said lateral wall.

The inner impervious envelope 2 is formed of a metallic membrane consisting for example of thin stainless steel sheet and is desirably provided with substantially, spaced corrugations generally arranged into a pair of sets or systems of orthogonally intersecting, inward projecting corrugations and adapted to retain the dimensional stability of the inner envelope by absorbing the thermal deformations by expansion and contraction.

This membrane-like inner envelope 2 is applied onto, bears against and is backed by at least one intermediate layer of heat-insulating materials 3, interposed between the membrane 2 and the outer concrete structure 1. The configuration of the tank top or roof in the shape of a frustum of a cone is advantageous by providing a surface which is geometrically developable on a plane, thereby resulting in simplified formworks, shutterings or framings for casting, working or placing the concrete as well as the steps of mounting the membrane 2 to have it applied onto the underside of said top or roof.

The inner wall surface of the outer shell, casing or vessel made of reinforced and/or prestressed concrete is lined, faced or covered over and throughout its whole extent by a thin steel sheet 4 which thus forms an intermediate fluid-tight envelope interposed between the heat-insulating layer 3 and the self-supporting concrete structure 1.

Within the inner envelope 2 is contained the liquefied natural gas 5 to be stored, for example methane, the liquid phase of which is topped by a gaseous or vapour phase 6 located above the level of the free surface of the liquid. The inner gaesous medium or space 6 communicates constantly with the heat-insulating space 3 through at least one duct or the like 7 open at both of its opposite ends, mounted within the tank ceiling and extending through the impervious membrane 2, so as to interconnect both spaces 6 and 3 permanently. Thus, both opposite faces or sides of the membrane 2 are subjected to the same gaseous fluid pressure which is thereby directly transferred or transmitted to the strong or rigid concrete structure 1 by being applied to the wall of the fluid-tight intermediate envelope 4.

It is to be understood that the invention should not be construed as limited to the embodiment described and shown which has been given by way of illustration only, as many modifications and alterations may be resorted to by those skilled in or conversant with the art without departing from the gist or scope of the invention. In particular it comprises all the means forming technical equivalents to the means described as well as their combinations, if they are carried out or put into practice according to the spirit, principles and teachings of the invention as defined in the appended claims.

What is claimed is:

1. A stationary above-ground tank construction for storing an at least partially liquid pressure fluid at a temperature very different from ambient temperature, such as a strongly cooled liquefied natural gas, comprising: an outer substantially rigid envelope of strong self-supporting structure made of reinforced concrete, adapted to withstand pressure, and having its inner wall face lined and covered by a continuous thin, ordinary metal sheet, such as a low alloy steel adapted to transmit any load applied thereto from the inside to said outer envelope; an inner fluid-confining, thin-walled, impervious envelope made of noble metal surrounded by and spaced from said outer envelope and the wall of which forms a flexible membrane; at least one layer of load-bearing, heat insulating material supporting and backing said inner envelope and interposed between said inner and outer envelopes so as to fill out the intermediate space left therebetween while bearing against said outer envelope; and at least one open-ended duct extending through the upper wall portion of said inner envelope to open and lead by its opposite ends, respectively, into said intermediate heat-insulating space and into that portion of the inner space of said envelope which contains the gaseous phase of said fluid above the free surface level of its liquid phase, thereby interconnecting both spaces constantly to provide permanent intercommunication therebetween for balancing and substantially equalizing the gaseous fluid pressures exerted upon the opposite sides of the wall of said inner envelope, so as to transfer said gaseous pressure to said outer envelope.

2. A tank construction according to claim 1, wherein said outer envelope has a substantially circular cylindrical shape with a substantially vertical axis of revolution and a roof substantially in the shape of a coaxial frustum of a cone, said heat insulating material consisting of perlite and said inner envelope being made of stainless steel and formed with two orthogonally intersecting sets of spaced, parallel, inward projecting corrugations.

References Cited

UNITED STATES PATENTS

| | | | |
|---|---|---|---|
| 2,382,171 | 8/1945 | Pomykala | 52—224 |
| 3,531,742 | 11/1950 | Pomykala | 52—349 |
| 644,259 | 2/1900 | Ostergren | 220—9B |
| 1,976,688 | 10/1934 | Dana et al. | 220—9A1 |
| 2,314,657 | 3/1943 | Norris | 220—9B |
| 3,088,621 | 5/1963 | Brown | 220—9A1 |
| 3,151,416 | 10/1964 | Eakin et al. | 52—249 |
| 3,411,656 | 10/1968 | Jackson | 220—9A1 |

FOREIGN PATENTS

| | | | |
|---|---|---|---|
| 1,383,795 | 11/1964 | France | 52—249 |

FRANK L. ABBOTT, Primary Examiner

J. L. RIDGILL, JR, Assistant Examiner

U.S. Cl. X.R.

52—249; 220—9, 10